(12) United States Patent
Olson et al.

(10) Patent No.: US 6,343,666 B1
(45) Date of Patent: *Feb. 5, 2002

(54) SNOWMOBILE FRONT SUSPENSION

(75) Inventors: Jerry A. Olson, Roseau; Richard H. Bates, Jr., Badger, both of MN (US)

(73) Assignee: Polaris Industries Inc., Minneapolis, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/947,983

(22) Filed: Oct. 9, 1997

(51) Int. Cl.[7] .............................................. B62M 27/02
(52) U.S. Cl. ...................................... 180/182; 180/190
(58) Field of Search ............................... 180/182, 190, 180/186; 280/124, 148, 21.1

(56) References Cited

U.S. PATENT DOCUMENTS

| | | | |
|---|---|---|---|
| 4,372,567 A | * 2/1983 | Yasui et al. | 280/21.1 |
| 4,620,604 A | * 11/1986 | Talbot | 180/190 |
| 4,633,964 A | * 1/1987 | Boyer et al. | 280/21.1 |
| 4,671,521 A | * 6/1987 | Talbot et al. | 180/190 |
| 5,242,176 A | * 9/1993 | Hendrickson | 280/25 |
| 5,251,718 A | * 10/1993 | Inagawa et al. | 180/190 |
| 5,443,278 A | * 8/1995 | Berto | 280/21.1 |
| 5,613,570 A | * 3/1997 | Becker | 180/190 |
| 5,720,312 A | * 2/1998 | Scheuermann | 135/88.09 |
| 5,957,230 A | * 9/1999 | Harano et al. | 180/68.4 |
| 6,009,966 A | * 1/2000 | Olson et al. | 180/182 |

FOREIGN PATENT DOCUMENTS

CA        1227823       10/1987 .................. 305/38

* cited by examiner

*Primary Examiner*—Brian L. Johnson
*Assistant Examiner*—Avraham H. Lerner
(74) *Attorney, Agent, or Firm*—Fredrikson & Byron, P.A.

(57) ABSTRACT

A front snowmobile suspension of the type having a ski carried at the front end of a trailing arm. The front end of the trailing arm is pivotably secured to the chassis by a pair of generally transversely mounted radius rods. The rear end of the trailing arm is pivotably secured to the chassis at a position sufficiently closer to the chassis centerline than the front end of the trailing arm that the trailing arm is oriented at an angle of at least about 8°, and preferably at least about 10°, with respect to the chassis centerline. In this location the rear end of the trailing arm may be positioned inboard of at least a portion of a body panel (typically the side panel)—i.e. the rear end of the trailing arm is disposed between the body panel and the centerline of the chassis.

17 Claims, 3 Drawing Sheets

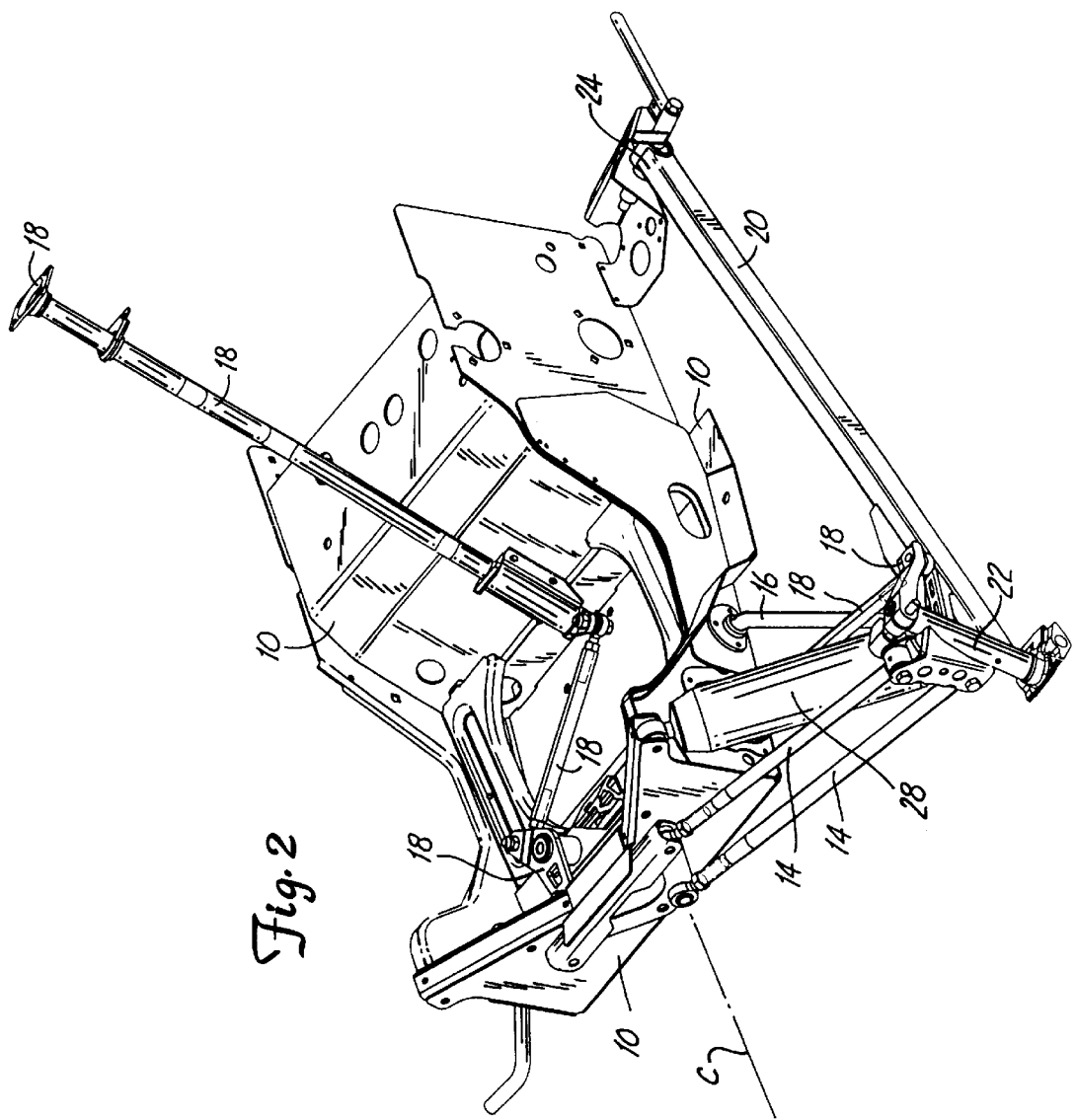

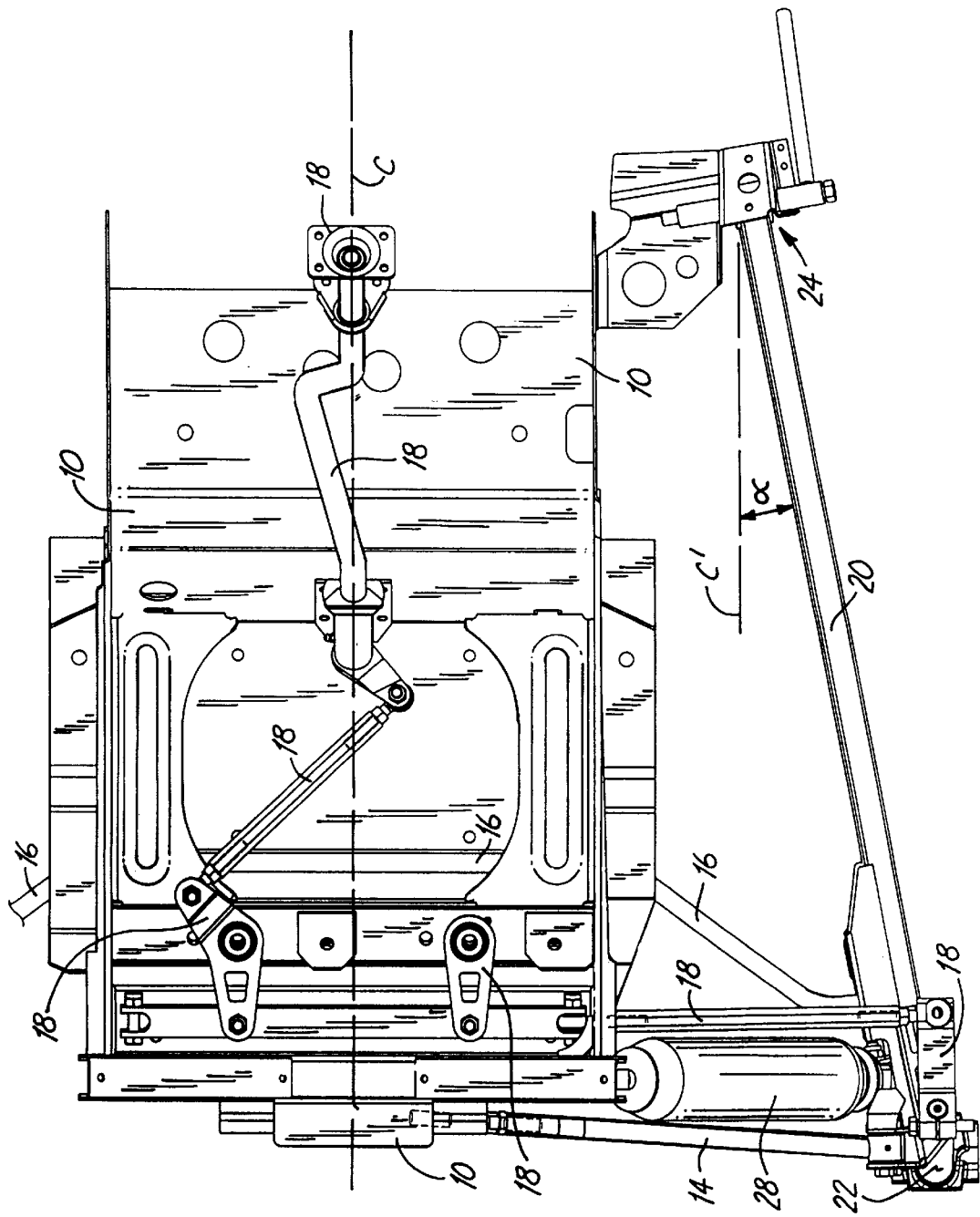

SNOWMOBILE FRONT SUSPENSION

TECHNICAL FIELD

The invention relates to snowmobile front suspension systems, and, in particular, to improvements in independent front suspension systems of the type employing a rear trailing arm.

BACKGROUND OF THE INVENTION

A variety of front suspension systems have been employed on snowmobiles over the years. In the early 1980's the assignee of the present invention introduced to the snowmobiling industry an independent front suspension system utilizing a trailing arm—i.e., an elongated arm having its front end connected to the steering spindle, and the rear end pivotably connected to the chassis (see, e.g., Canadian Pat. No. 1,227,823). The trailing arm is oriented generally parallel to the snowmobile's longitudinal centerline, being angled inwardly at the rear end by only about, e.g., 5°, reflecting the fact that the ski stance desirably is slightly wider than the body of the snowmobile.

While the trailing arm suspension system has been widely accepted in the snowmobile industry as a very good snowmobile front suspension design, applicants have found that further improvements in the system can be made, providing even greater stability and performance advantages for the rider.

SUMMARY OF THE INVENTION

The invention provides a front snowmobile suspension of the type having a ski spindle extending upwardly from a ski, the ski spindle being pivotably carried by the front end of a trailing arm. The front end of the trailing arm is pivotably secured to the chassis by a pair of generally transversely mounted radius rods; each radius rod has an inner end pivotably attached to the chassis and an outer end pivotably attached to the front end of the trailing arm. The radius rods permit upward and downward movement of the front end of the trailing arm. The rear end of the trailing arm is pivotably secured to the chassis at a position sufficiently closer to the chassis centerline than the front end of the trailing arm so that the trailing arm is oriented at an angle of at least about 8°, and preferably at least about 10°, with respect to the chassis centerline. At this location the rear end of the trailing arm may be positioned inboard of at least a portion of a body panel (typically the side panel)—i.e. the rear end of the trailing arm is disposed between the body panel and the centerline of the chassis. This unique positioning of the trailing arm has been found to provide increased stability and performance advantages for the rider.

BRIEF DESCRIPTION OF THE DRAWINGS

FIG. 2 is a perspective view of a portion of the chassis of a snowmobile illustrating attachment of the front suspension of the invention to the chassis; and FIG. 3 is a top view of the portion of the chassis shown in FIG. 2.

DETAILED DESCRIPTION OF THE INVENTION

Figure 1:
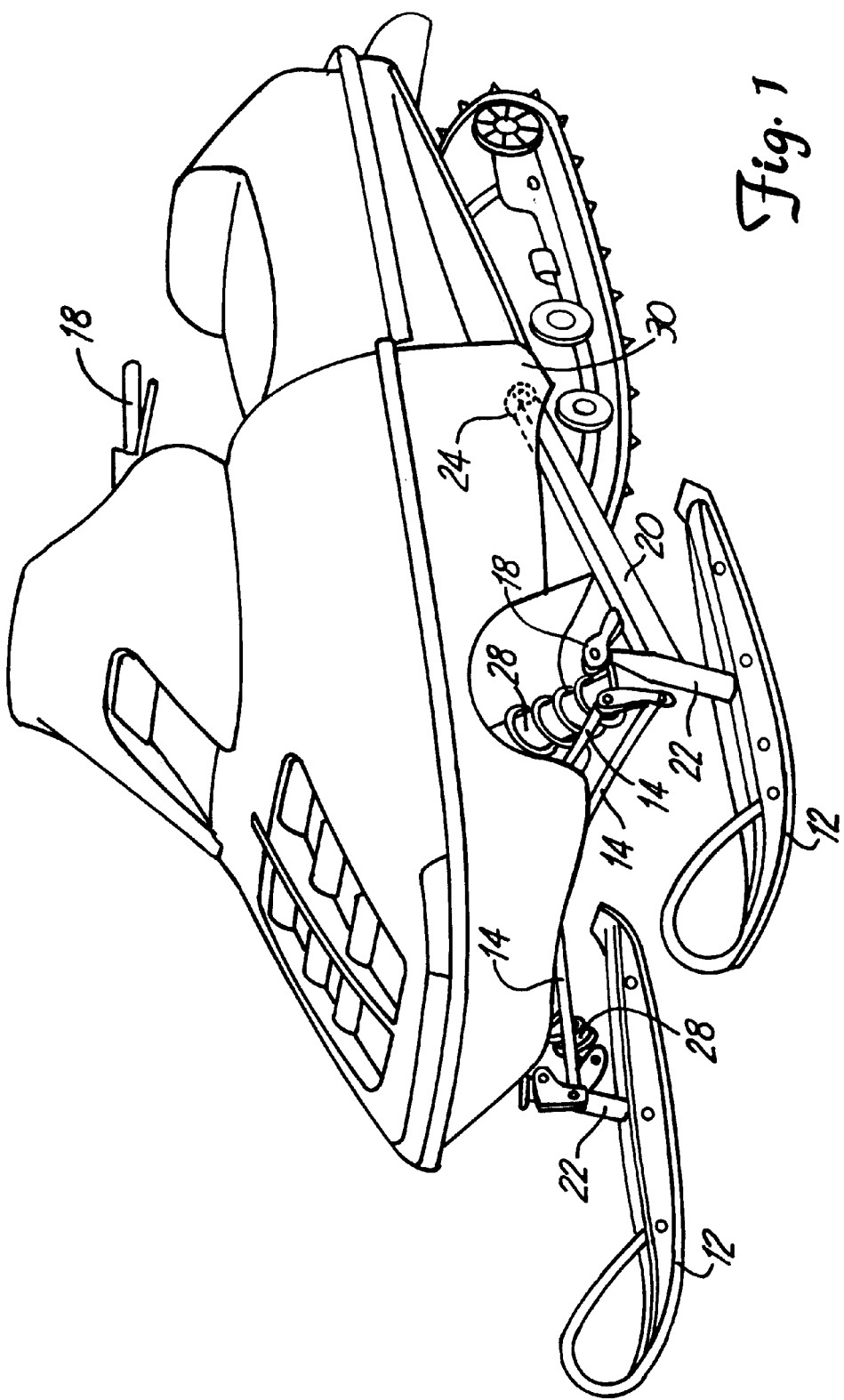
FIG. 1 is a perspective view of a snowmobile incorporating the front suspension of the invention.

FIG. 1 depicts generally a snowmobile having a front suspension of the invention, and FIGS. 2–3 provide further details regarding the components of the suspension. The chassis 10 of the snowmobile (concealed by body panels and other snowmobile components in FIG. 1) provides a basic framework to which the various components of the suspension system of the invention may be mounted. As indicated above, the suspension system is generally considered to be an independent suspension system since the left and right skis are permitted to move upwardly and downwardly generally independently of each other (in many cases, however, it is desirable to connect the two sides through a torsion bar, as is described in detail in the Canadian patent identified above). Thus, each side of the suspension system is essentially a mirror image of the other, and the following discussion of the system will be with reference to the left side of the system, as shown in detail in FIGS. 2–3.

The ski 12 is secured to an upwardly extending spindle. The spindle in turn is rotatably disposed within (and, in the drawings, concealed by) a generally cylindrical sleeve 22 carried at the front end of the trailing arm 20. The spindle is rotated by a steering linkage system (various components of which are identified by the common reference number 18 in the drawings) to cause the ski to turn in the desired direction.

The front end of the trailing arm 20 is linked to the chassis 10 by a pair of radius rods 14 which are oriented generally transversely to the centerline "C" of the snowmobile. The radius rods have pivotable joints on each end to permit the front end of the trailing arm 20 to move upward and downward. The rear end 24 of the trailing arm 20 is also pivotably mounted to the chassis in such a fashion as to permit the front end of the trailing arm 20 to move upward and downward. The combination of the radius rods 14 and the trailing arm 20 thus provide a geometrically stable mounting structure for the ski 12. A suitable shock absorber 28 and coil spring typically is connected from the front end of the trailing arm 20 to the chassis 10 to provide the suspension with the desired suspension characteristics.

To provide enhanced stability and performance for the suspension the rear end 24 of the trailing arm 20 is mounted substantially further inwardly (i.e., closer to the centerline "C") of the front end of the trailing arm than in prior art trailing arm suspension systems. Consequently, the trailing arm 20 is set at an angle α with respect to the centerline "C"; desirably a is at least about 8°, and preferably a is at least about 10°. Applicants have achieved very good results using both 10° and 11°. When moved inwardly to this position the rear end 24 of the trailing arm 20 may conveniently be concealed behind a portion of the side panel 30 of the snowmobile body. That is, the adjacent body panel, which constitutes a portion of the overall body panels surrounding the chassis, extends downwardly around the outside surface of the rear end 24 of the trailing arm 20, placing the rear end 24 of the trailing arm 20 between this portion of the body panel and the centerline "C" of the snowmobile so that, viewed from the side, the rear end 24 of the trailing arm is concealed by the portion of the body panel 30.

By moving the rear end 24 of the trailing arm 20 inboard in comparison to prior art trailing arm suspensions the suspension system is afforded greater stability and better performance for the rider. Whenever the ski encounters an object during operation, whether the object be a chunk of snow or ice, a mogul, or any other object over which the ski passes, the suspension system is designed to permit the ski to travel over the object while providing a relatively smooth, controlled ride to the driver. Some of the force of the perturbance is absorbed by vertical displacement of the ski; the radius rods, trailing arm, shock absorber and spring all permit the ski to move upwardly with respect to the snowmobile chassis (the shock and spring predominantly absorbing this force). Some of the force of the perturbance, however, is absorbed as a longitudinal force by the trailing arm 20. Because the trailing arm is generally parallel to the centerline "C" of the snowmobile, and its rear end is mounted to the side of the chassis, the longitudinal force results in a high yaw moment load on the chassis. If both skis encounter the same object at the same time, the respective yaw moments typically cancel each other. If either ski experiences a perturbance that is not exactly mirrored by the other ski, however, the chassis realizes a resultant yaw moment. Thus, Applicants have discovered that they can reduce the yaw moment by moving the rear end 24 of the trailing arm 20 inward (i.e., toward the centerline "C" and the center of gravity of the snowmobile), thereby providing better handling characteristics to the rider.

While a preferred embodiment of the present invention has been described, it should be understood that various changes, adaptations and modifications may be made therein without departing from the spirit of the invention and the scope of the appended claims.

What is claimed is:

1. A snowmobile comprising;
a chassis, having a longitudinal centerline, and a pair of skis, each ski being secured to the chassis by a ski suspension system including
a ski spindle extending upwardly from the ski,
a trailing arm having front and rear ends, the front end of the trailing arm including a generally cylindrical sleeve for pivotably receiving the ski spindle therein, the rear end of the trailing arm being pivotably secured to the chassis, and
a pair of radius rods mounted generally transverse to the longitudinal centerline of the chassis, each radius rod having an inner end pivotably attached to the chassis and an outer end pivotably attached to the front end of the trailing arm; and
an integral body panel enclosing and conforming to at least a portion of the chassis, the trailing arm being angled outwardly from the chassis' centerline such that the front end of the trailing arm is spaced farther from the centerline than the rear end of the trailing arm and, viewed from the side, the front end of the trailing arm being visible while the rear end of the trailing arm is concealed by a portion of the body panel.

2. The snowmobile of claim 1 wherein the rear end of the trailing arm is pivotably secured to the chassis at a position such that, viewed from above, the trailing arm forms an angle of at least 8° with respect to the chassis centerline.

3. The snowmobile of claim 1, wherein the rear end of the trailing arm is pivotably secured to the chassis at a position such that the trailing arm is oriented at an angle of at least 10° with respect to the chassis centerline.

4. A snowmobile comprising a chassis having a longitudinal centerline, a pair of skis, each ski being secured to the chassis by one or more radius rods and a trailing arm having front and rear ends, and an integral body panel enclosing and conforming to at least a portion of the chassis, the trailing arm being angled outwardly from the chassis' centerline such that the front end of the trailing arm is spaced farther from the centerline than the rear end of the trailing arm and, viewed from the side, the front end of the trailing arm being visible while the rear end of the trailing arm is concealed by a portion of the body panel.

5. The snowmobile of claim 4, wherein at least a portion of the body panel covers an outside surface of the rear end of the trailing arm.

6. The snowmobile of claim 4 wherein the rear end of the trailing arm is pivotably secured to the chassis at a position such that, viewed from above, the trailing arm forms an angle of at least 8° with respect to the chassis centerline.

7. The snowmobile of claim 4 wherein the rear end of the trailing arm is pivotably secured to the chassis at a position such that the trailing arm is oriented at an angle of at least 10° with respect to the chassis centerline.

8. A snowmobile comprising;
a chassis, having a longitudinal centerline, and a pair of skis, each ski being secured to the chassis by a ski suspension system including
a ski spindle extending upwardly from the ski,
a trailing arm having front and rear ends, the front end of the trailing arm including a generally cylindrical sleeve for pivotably receiving the ski spindle therein, and
a pair of radius rods mounted generally transverse to the longitudinal centerline of the chassis, each radius rod having an inner end pivotably attached to the chassis and an outer end pivotably attached to the front end of the trailing arm; and
an integral body panel enclosing and conforming to at least a portion of the chassis, the trailing arm being angled outwardly from the chassis' centerline such that the front end of the trailing and is spaced farther from the centerline than the rear end of the trailing arm such that the front end of the trailing arm is visible when viewed from the side, the rear end of the trailing arm being pivotably secured to the chassis adjacent to a lower side panel of the body panel, the rear end of the trailing arm being disposed between the lower side panel and the centerline of the chassis.

9. The snowmobile of claim 8 wherein the rear end of the trailing arm is pivotably secured to the chassis at a position such that, viewed from above, the trailing arm forms an angle of at least 8° with respect to the chassis centerline.

10. The snowmobile of claim 8, wherein the rear end of the trailing arm is pivotably secured to the chassis at a position such that the trailing arm is oriented at an angle of at least 10° with respect to the chassis centerline.

11. The snowmobile of claim 8, wherein at least a portion of the lower side panel covers an outside surface of the rear end of the trailing arm.

12. The snowmobile of claim 8, wherein the rear end of the trailing arm is secured to the chassis at a position such that, viewed from the side, the rear end of the trailing arm is concealed by the lower body panel.

13. A snowmobile comprising a chassis having a longitudinal centerline, a pair of skis, each ski being secured to the chassis by one or more radius rods and a trailing arm having front and rear ends, an integral body panel enclosing and conforming to at least a portion of the chassis, the trailing arm being angled outwardly from the chassis' centerline such that the front end of the trailing arm is spaced farther from the centerline than the rear end of the trailing arm such that the front end of the trailing arm is visible when viewed from the side, the rear end of the trailing arm being pivotably secured to the chassis adjacent to a lower side panel of the body panel, the lower side panel enclosing and conforming to a portion of the chassis, the rear end of the trailing arm being located inward of at least a portion of the lower side panel.

14. The snowmobile of claim 13 wherein the rear end of the trailing arm is pivotably secured to the chassis at a position such that, viewed from above, the trailing arm forms an angle of at least 8° with respect to the chassis centerline.

15. The snowmobile of claim 13 wherein the rear end of the trailing arm is pivotably secured to the chassis at a position such that the trailing arm is oriented at an angle of at least 10° with respect to the chassis centerline.

16. The snowmobile of claim 13, wherein the rear end of the trailing arm is secured to the chassis at a position such that, viewed from the side, the rear end of the trailing arm is covered by the lower side panel.

17. The snowmobile of claim 13, wherein the rear end of the trailing arm is secured to the chassis at a position such that, viewed from the side, the rear end of the trailing arm is concealed by the lower body panel.

* * * * *